(12) United States Patent
Le Blanc

(10) Patent No.: US 6,584,724 B1
(45) Date of Patent: Jul. 1, 2003

(54) FISH LANDING NET APPARATUS

(76) Inventor: Dennis D. Le Blanc, P.O. Box 571, Strathmore, CA (US) 93267

( * ) Notice: Subject to any disclaimer, the term of this patent is extended or adjusted under 35 U.S.C. 154(b) by 0 days.

(21) Appl. No.: 10/076,465

(22) Filed: Feb. 15, 2002

(51) Int. Cl.[7] .............................................. A01K 77/00
(52) U.S. Cl. ........................................................ 43/11
(58) Field of Search ................ 43/7, 11, 12; 242/379.2; 224/271, 920

(56) References Cited

U.S. PATENT DOCUMENTS

| | | | | |
|---|---|---|---|---|
| 2,469,978 A | * | 5/1949 | Mrozinski | 242/379.2 |
| 2,732,148 A | * | 1/1956 | Lummis | 242/379.2 |
| 2,841,847 A | * | 5/1958 | Wallace | 43/11 |
| 2,850,829 A | * | 9/1958 | Buzzini | 43/12 |
| 2,874,506 A | * | 2/1959 | Cliff | 43/11 |
| 3,062,478 A | * | 11/1962 | Adachi | 242/379.2 |
| 4,571,875 A | | 2/1986 | Ballas | |
| 5,456,037 A | | 10/1995 | Dorval | |
| D389,895 S | | 1/1998 | Belleville | |
| 5,782,708 A | | 7/1998 | Kimball | |
| 5,815,977 A | | 10/1998 | Hill | |
| 5,938,137 A | | 8/1999 | Poulson | |
| 6,073,875 A | * | 6/2000 | Paugh | 242/379.2 |
| 6,290,158 B1 | * | 9/2001 | Huang | 242/379.2 |

* cited by examiner

*Primary Examiner*—Kurt Rowan

(57) ABSTRACT

A fish landing net apparatus for facilitating landing of a fish without loosing the net. The fish landing net apparatus includes a housing having a perimeter wall. The perimeter wall defines an interior space. The housing is designed for securing to the user. A reel assembly is positioned within the interior space of the housing. A cable member extends from the housing. The cable member is coupled to the reel assembly whereby the reel assembly is for winding the cable member back into the interior space of the housing when the cable member has been extended from the housing. A landing member is coupled to the cable member opposite the reel assembly. The reel assembly draws the landing member back towards the housing when the user releases the landing member. The landing member is designed for facilitating retrieval of the fish when the user has reeled in the fish.

11 Claims, 5 Drawing Sheets

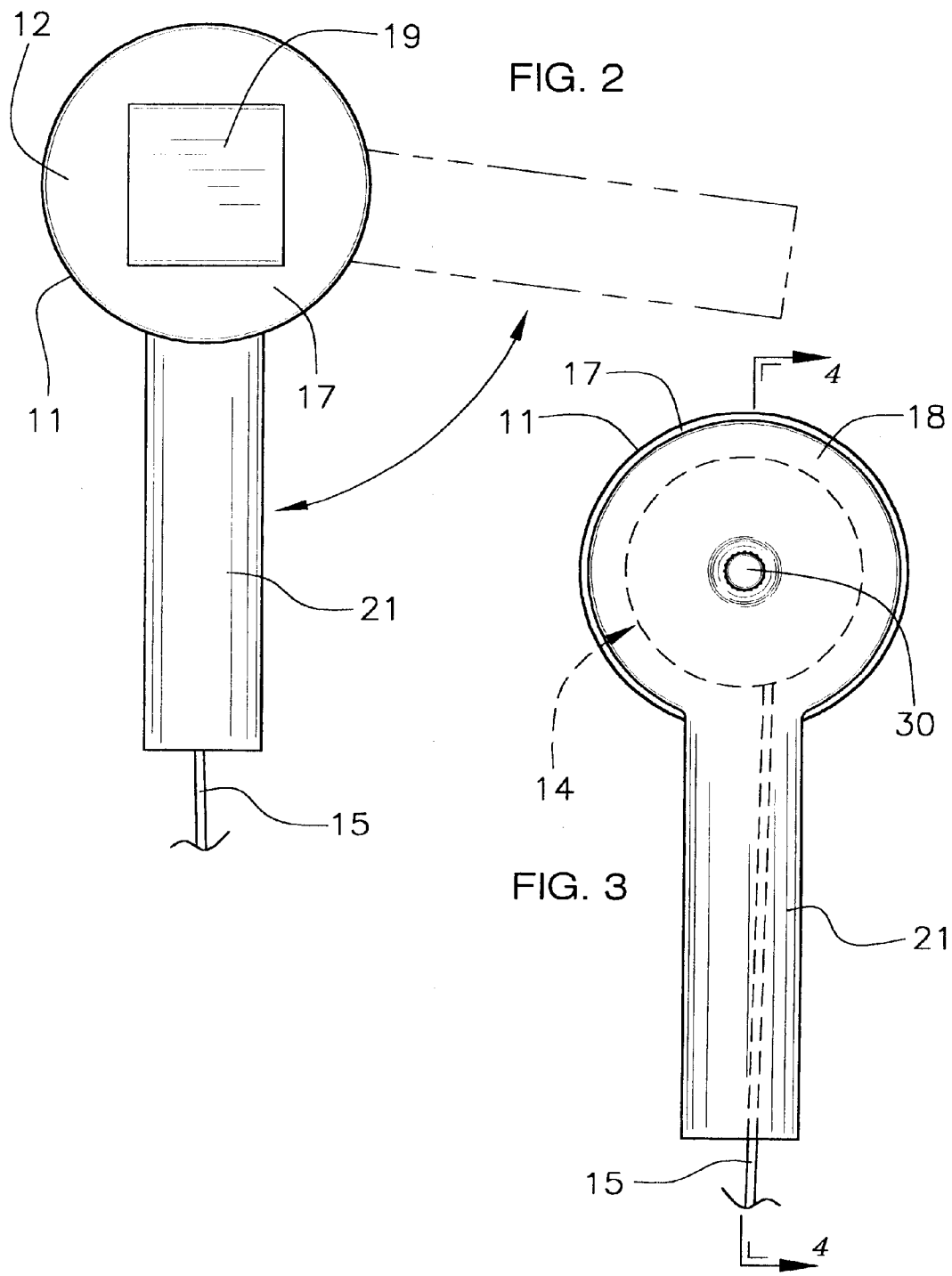

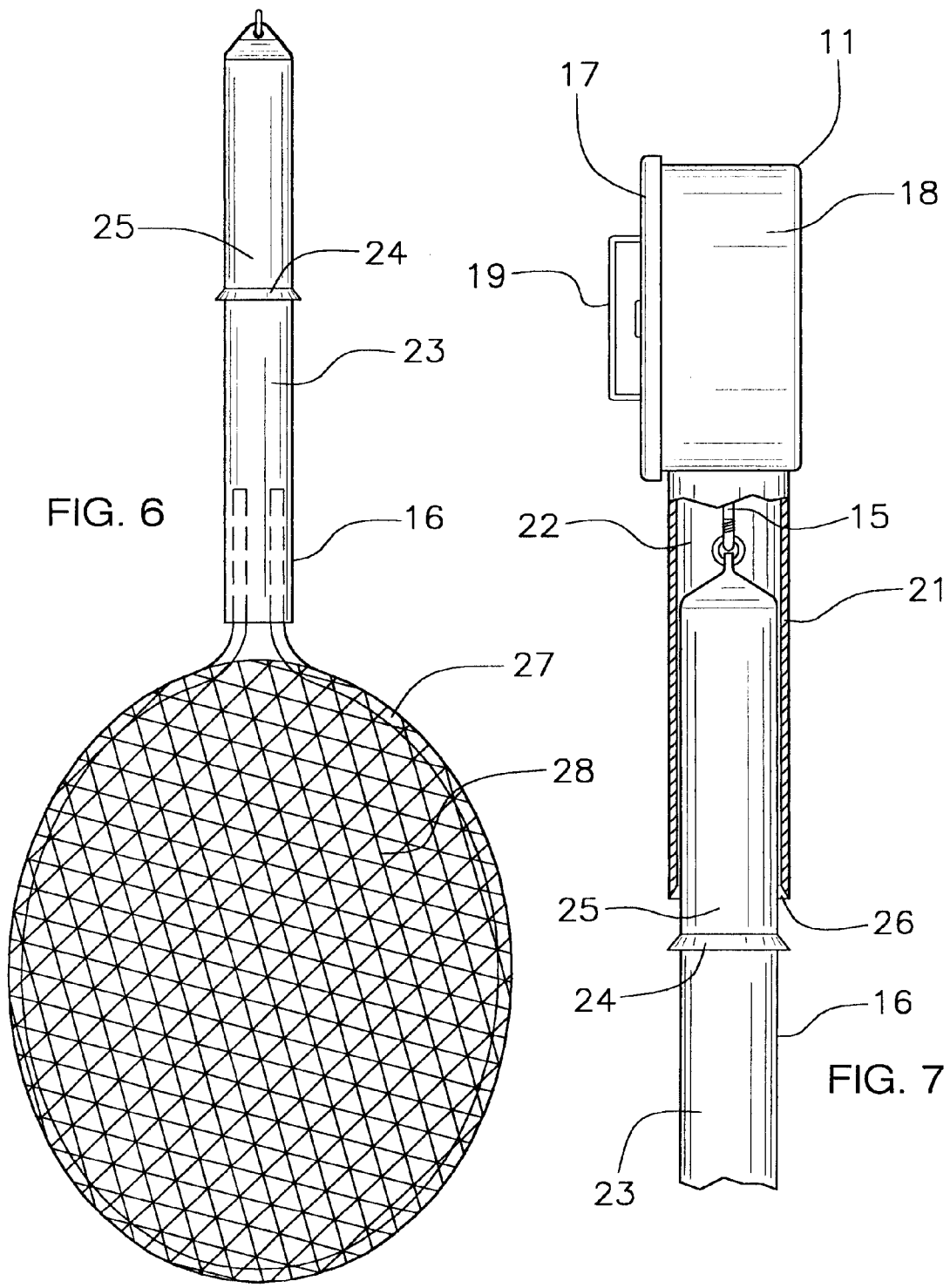

FISH LANDING NET APPARATUS

BACKGROUND OF THE INVENTION

1. Field of the Invention

The present invention relates to fishing nets and more particularly pertains to a new fish landing net apparatus for facilitating landing of a fish without loosing the net.

2. Description of the Prior Art

The use of fishing nets is known in the prior art. U.S. Pat. No. 4,571,875. describes a device for holding the net flat against the handle when the net is not in use. Another type of fishing net is U.S. Pat. No. 4,456,037 having an apparatus for securing a fishing net to the arm of user to permit the user use of both hands while handling a landed fish. U.S. Pat. No. 4,456,037 has a lanyard for being coupled to a user and fishing equipment to allow the user to pull on the lanyard to retrieve dropped fishing equipment.

While these devices fulfill their respective, particular objectives and requirements, the need remains for a device that has certain improved features allows for automatic recovery of a dropped fishing net.

SUMMARY OF THE INVENTION

The present invention meets the needs presented above by providing a reel assembly for retracting a cable member coupled to landing member when the landing member is released by the user.

Still yet another object of the present invention is to provide a new fish landing net apparatus that prevents the loss of the landing member should the landing member become dislodged from the hand of the user.

To this end, the present invention generally comprises a housing having a perimeter wall. The perimeter wall defines an interior space. The housing is designed for selectively securing to the user when the user is fishing. A reel assembly is positioned within the interior space of the housing. A cable member extends from the housing. The cable member is coupled to the reel assembly whereby the reel assembly is for winding the cable member back into the interior space of the housing when the cable member has been extended from the housing. A landing member is coupled to the cable member opposite the reel assembly. The reel assembly draws the landing member back towards the housing when the user releases the landing member. The landing member is designed for facilitating retrieval of the fish when the user has reeled in the fish.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the housing of the present invention.

FIG. 3 is a side view of the housing of the present invention.

FIG. 6 is a top view of the landing member of the present invention.

FIG. 7 is a partial cross-sectional view of the present invention showing the handle portion of the landing member positioned in the tube portion.

DESCRIPTION OF THE PREFERRED EMBODIMENT

Figure 1:
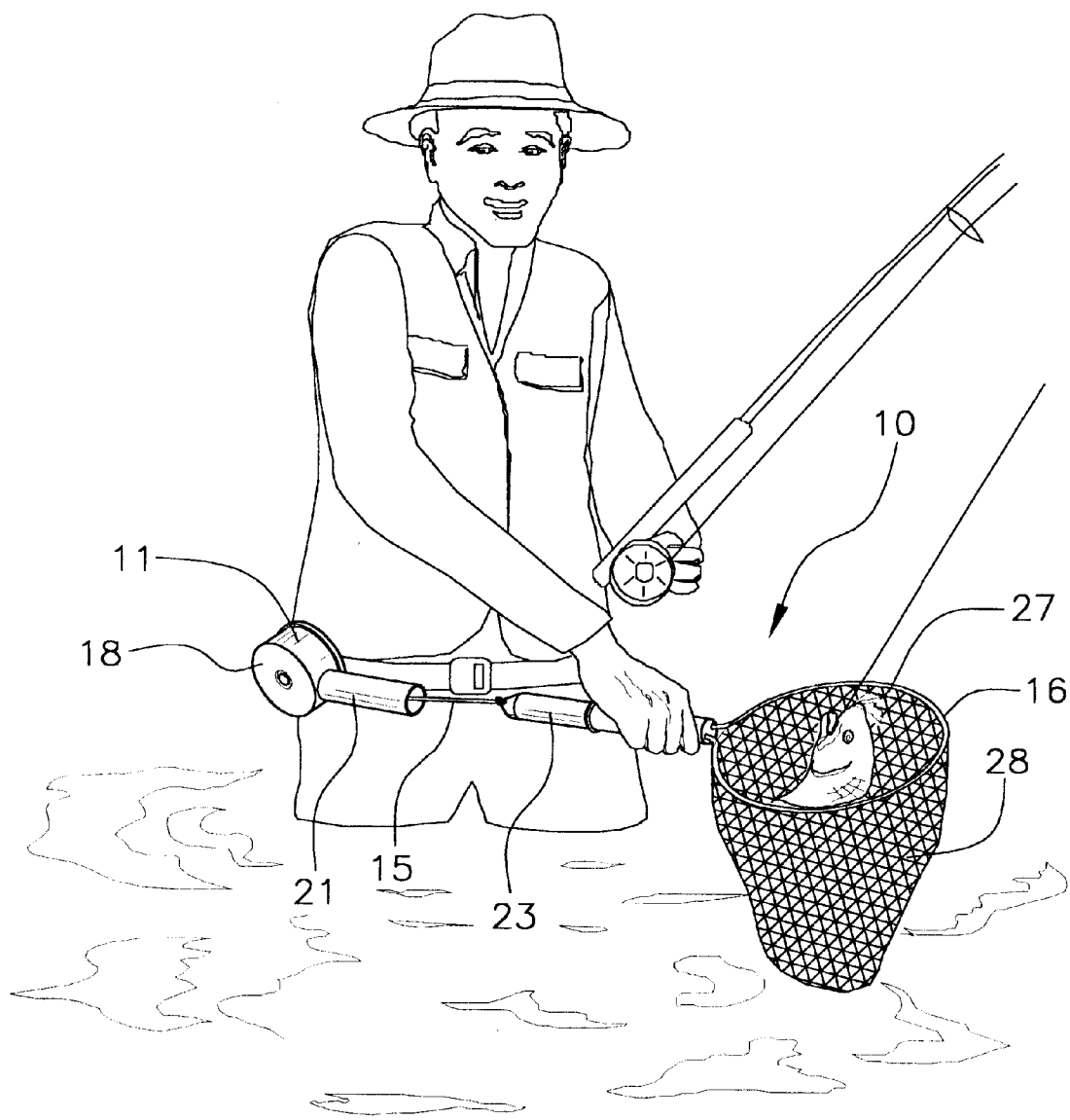
FIG. 1 is a perspective view of a new fish landing net apparatus according to the present invention shown in use.
Figure 4:
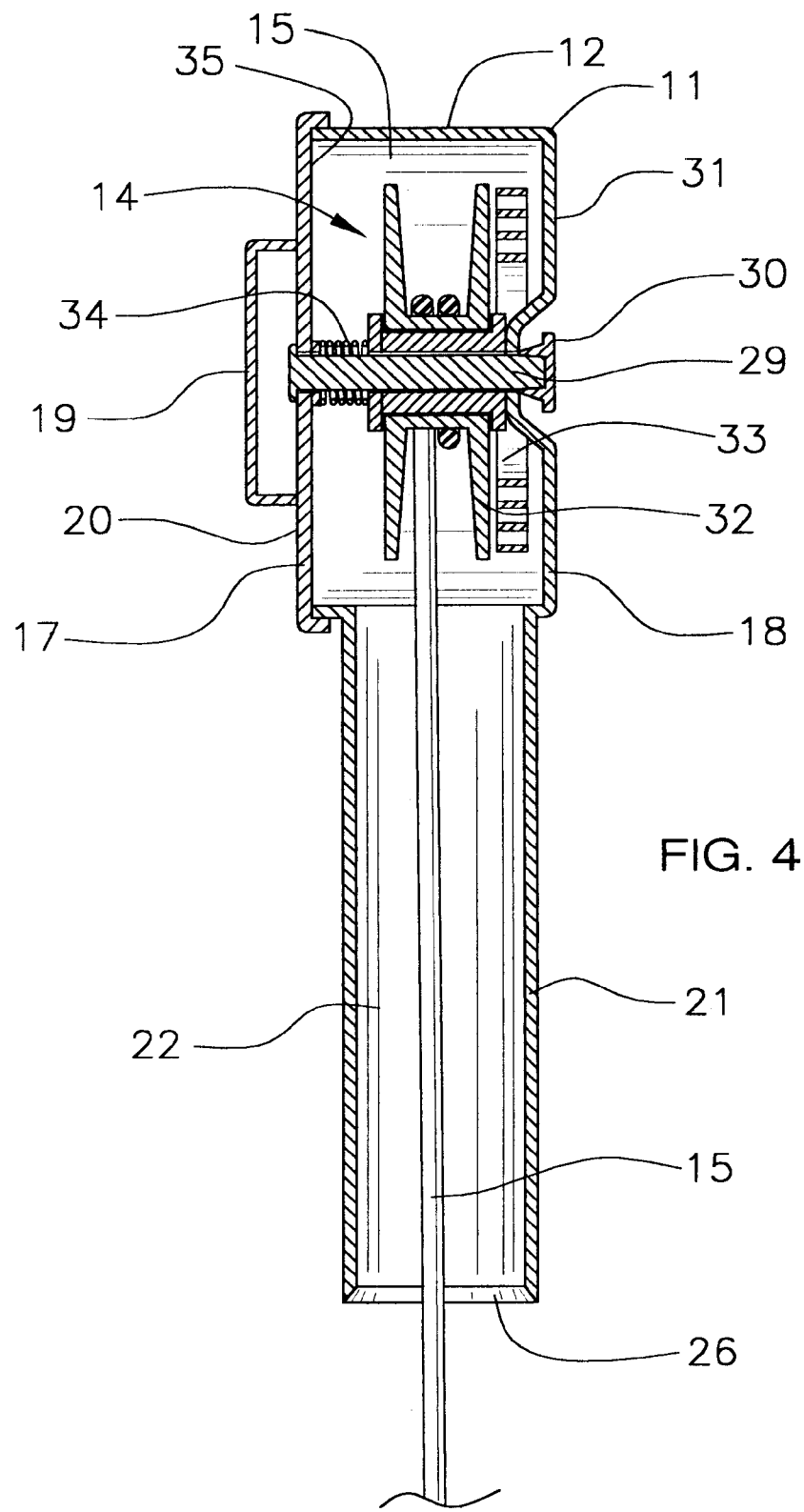
FIG. 4 is a cross-sectional view of the present invention taken along line 4—4 of FIG. 3.
Figure 5:
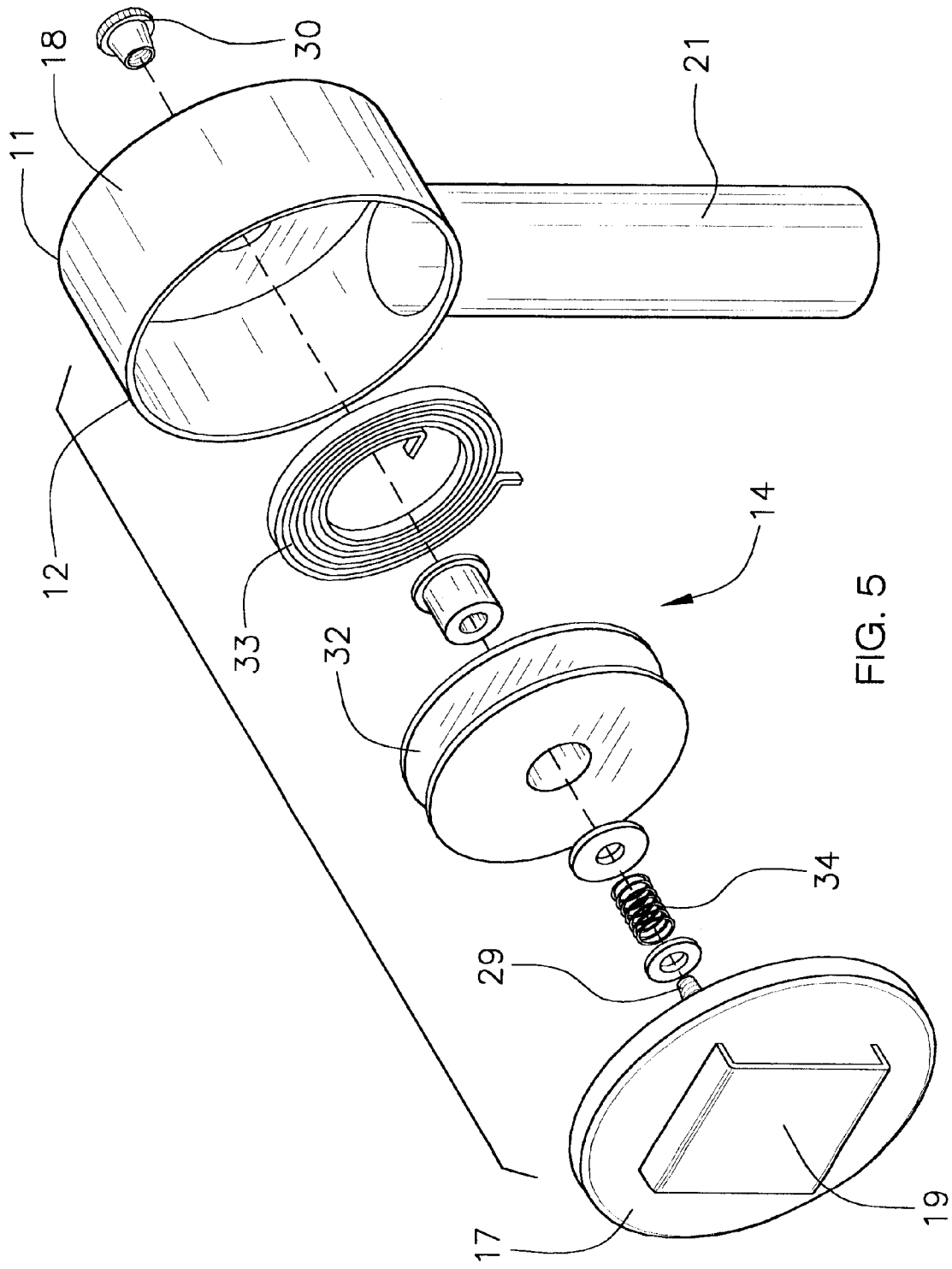
FIG. 5 is an exploded perspective view of the present invention.

With reference now to the drawings, and in particular to FIGS. 1 through 7 thereof, a new fish landing net apparatus embodying the principles and concepts of the present invention and generally designated by the reference numeral 10 will be described.

As best illustrated in FIGS. 1 through 7, the fish landing net apparatus 10 generally comprises a housing 11 having a perimeter wall 12. The perimeter wall 12 defines an interior space 13. The housing 11 is designed for selectively securing to the user when the user is fishing. A reel assembly 14 is positioned within the interior space 13 of the housing 11.

A cable member 15 extends from the housing 11. The cable member 15 is coupled to the reel assembly 14 whereby the reel assembly 14 is for winding the cable member 15 back into the interior space 13 of the housing 11 when the cable member 15 has been extended from the housing 11.

A landing member 16 is coupled to the cable member 15 opposite the reel assembly 14. The reel assembly 14 draws the landing member 16 back towards the housing 11 when the user releases the landing member 16. The landing member 16 is designed for facilitating retrieval of the fish when the user has reeled in the fish.

The perimeter wall 12 of the housing 11 has a cap portion 17 and a base portion. The cap portion 17 is selectively removable from the base portion. The reel portion is designed for being accessed by the user when the cap portion 17 is removed from the base portion of the perimeter wall 12.

A loop member 19 is coupled to an exterior surface 20 of the cap portion 17 of the perimeter wall 12. The loop portion is designed for securing a belt of the user between the loop member 19 and the cap portion 17 whereby the cap portion 17 is secured to the belt of the user.

The perimeter wall 12 has a tube portion 21. The tube portion 21 extends from the base portion of the perimeter wall 12. The tube portion 21 has a lumen 22 in communication with the interior space 13 of the housing 11. The cable member 15 extends through the lumen 22 of the tube portion 21 of the perimeter wall 12 whereby the tube member is for guiding the cable member 15 when the cable member 15 is retracted by the reel assembly 14. The base portion of the perimeter wall 12 is pivotal with respect to the cap portion 17 of the perimeter wall 12 whereby the tube portion 21 is selectively positionable to accommodate lifting and lowering of the cable member 15 when the user is using the landing member 16.

The landing member 16 has a handle portion 23. The handle portion 23 is coupled to the cable member 15. The handle portion 23 of the landing member 16 is receivable in the lumen 22 of the tube portion 21 of the perimeter wall 12 when the reel assembly 14 retracts the cable member 15 into the interior space 13 of the housing 11. The handle portion 23 is designed for being selectively gripped by the hand of the user when the user is landing the fish.

The handle portion 23 of the landing member 16 has a ridge 24. The ridge 24 is positioned proximate a medial portion 25 of the handle portion 23 of the landing member 16. The ridge 24 abuts the tube portion 21 when the reel assembly 14 retracts the cable member 15 into the interior space 13 of the housing 11 for permitting only a portion of the handle portion 23 of the landing member 16 to be positioned in the lumen 22 of the tube portion 21. The tube member has a lip 26 being positioned opposite the base portion of the perimeter wall 12. The lip 26 is for receiving the ridge 24 of the handle portion 23 for inhibiting rotation of the landing member 16 with respect to the tube portion 21 to inhibit twisting of the cable member 15 when the cable member 15 is retracted into the interior space 13 of the housing 11.

The landing member 16 has a ring portion 27. The ring portion 27 is coupled to the handle portion 23 of the landing member 16. The landing member 16 has a net portion 28. The net portion 28 is coupled to the ring portion 27. The net portion 28 is designed for holding the fish when the fish is passed through the ring portion 27 and into the net portion 28 by the user.

The housing 11 has a spindle 29. The spindle 29 extends from the cap portion 17 through the interior space 13 of the housing 11 and the base portion of the perimeter wall 12. The reel assembly 14 is rotatably coupled to the spindle 29 whereby the reel assembly 14 is permitted to rotate around the spindle 29. A nut member 30 is selectively coupled to the spindle 29 opposite the cap portion 17 of the perimeter wall 12 of the housing 11. The nut member 30 abutting an outer surface 31 of the base portion of the base portion of the perimeter wall 12 whereby the nut member 30 is for inhibiting separation of the base portion from the cap portion 17 of the perimeter wall 12.

The reel assembly 14 has a reel member 32. The reel member 32 is rotatably coupled to the spindle 29 member whereby the reel member 32 is permitted to rotate around the spindle 29. The real member is coupled to the cable member 15 opposite the landing member 16 whereby the cable member 15 is wound onto the reel member 32 when the reel member 32 is rotated to retract the cable member 15 into the interior space 13 of the housing 11.

The reel assembly 14 has a winding biasing member 33. The winding biasing member 33 is coupled between the reel member 32 and the housing 11. The winding biasing member 33 is positioned into a tensed state when the reel member 32 is rotated by the cable member 15 being extended from the housing 11. The winding biasing member 33 rotates the reel member 32 for winding the cable member 15 onto the reel member 32 when the cable member 15 is released after being extending from the housing 11.

The reel assembly 14 has a positioning biasing member 34. The positioning biasing member 34 is positioned around the spindle 29 whereby the positioning biasing member 34 is positioned between the reel member 32 and an interior surface 35 of the perimeter wall 12 of the housing 11. The positioning biasing member 34 is for maintaining positioning of the reel member 32 when the reel member 32 is rotating around the spindle 29.

In use, the user slips their belt between the loop portion and the cap portion 17 to secure the housing 11 to the user. The handle portion 23 is then gripped by the user and the drawn away from the housing 11 when the user catches a fish to facilitating landing and capturing of the fish. When the user releases the landing member 16 after the user has finished using the landing member 16 and the reel assembly 14 winds the cable member 15 into the interior space 13 and draws the landing member 16 to the housing 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish landing net apparatus for netting a fish by a user, the fish landing net apparatus comprising:

a housing having a perimeter wall, said perimeter wall defining an interior space, said housing being adapted for selectively securing to the user when the user is fishing;

a reel assembly being positioned within said interior space of said housing;

a cable member extending from said housing, said cable member being coupled to said reel assembly such that said reel assembly is for winding said cable member back into said interior space of said housing when said cable member has been extended from said housing;

a landing member being coupled to said cable member opposite said reel assembly, said reel assembly drawing said landing member back towards said housing when the user releases said landing member, said landing member being adapted for facilitating retrieval of the fish when the user has reeled in the fish;

said perimeter wall of said housing having a cap portion and a base portion, said cap portion being selectively removable from said base portion, said reel portion being adapted for being accessed by the user when said cap portion is removed from said base portion of said perimeter wall;

said perimeter wall having a tube portion, said tube portion extending from said base portion of said perimeter wall, said tube portion having a lumen in communication with said interior space of said housing, said cable member extending through said lumen of said tube portion of said perimeter wall such that said tube member is for guiding said cable member when said cable member is retracted by said reel assembly; and said landing member having a handle portion, said handle portion being coupled to said cable member, said handle portion of said landing member being receivable in said lumen of said tube portion of said perimeter wall when said reel assembly retracts said cable member into said interior space of said housing, said handle portion being adapted for being selectively gripped by the hand of the user when the user is landing the fish.

2. The fish landing net apparatus as set forth in claim 1, further comprising:

a loop member being coupled to an exterior surface of said cap portion of said perimeter wall, said loop portion being adapted for securing a belt of the user between said loop member and said cap portion such that said cap portion is secured to the belt of the user.

3. The fish landing net apparatus as set forth in claim 1, wherein said base portion of said perimeter wall is pivotal with respect to said cap portion of said perimeter wall such that said tube portion is selectively positionable to accommodate lifting and lowering of said cable member when the user is using said landing member.

4. The fish landing net apparatus as set forth in claim 1, further comprising:

said handle portion of said landing member having a ridge, said ridge being positioned proximate a medial portion of said handle portion of said landing member, said ridge abutting said tube portion when said reel assembly retracts said cable member into said interior space of said housing for permitting only a portion of said handle portion of said landing member to be positioned in said lumen of said tube portion.

5. The fish landing net apparatus as set forth in claim 1, further comprising:

said landing member having a handle portion, said handle portion being coupled to said cable member, said handle portion of said landing member being drawn back to said housing when said reel assembly retracts said cable member into said interior space of said housing, said handle portion being adapted for being selectively gripped by the hand of the user when the user is landing the fish.

6. The fish landing net apparatus as set forth in claim 5, further comprising:

said landing member having a ring portion, said ring portion being coupled to said handle portion of said landing member; and said landing member having a net portion said net portion being coupled to said ring portion, said net portion being adapted for holding the fish when the fish is passed through said ring portion and into said net portion by the user.

7. The fish landing net apparatus as set forth in claim 1, further comprising:

said housing having a spindle, said spindle extending through said interior space of said housing, said reel assembly being rotatably coupled to said spindle such that said reel assembly is permitted to rotate around said spindle.

8. The fish landing net apparatus as set forth in claim 7, further comprising:

said reel assembly having a reel member, said reel member being rotatably coupled to said spindle member such that said reel member is permitted to rotate around said spindle, said reel member being coupled to said cable member opposite said landing member such that said cable member is wound onto said reel member when said reel member is rotated to retract said cable member into said interior space of said housing.

9. The fish landing net apparatus as set forth in claim 8, further comprising:

said reel assembly having a winding biasing member, said winding biasing member being coupled between said reel member and said housing, said winding biasing member being positioned into a tensed state when said reel member is rotated by said cable member being extended from said housing, said winding biasing member rotating said reel member for winding said cable member onto said reel member when said cable member is released after being extending from the housing.

10. The fish landing net apparatus as set forth in claim 8, further comprising:

said reel assembly having a positioning biasing member, said positioning biasing member being positioned around said spindle such that said positioning biasing member is positioned between said reel member send an interior surface of said perimeter wall of said housing, said positioning biasing member being for maintaining positioning of said reel member when said reel member is rotating around said spindle.

11. A fish landing net apparatus for netting a fish by a user, the fish landing net apparatus comprising:

a housing having a perimeter wall, said perimeter wall defining an interior space, said housing being adapted for selectively securing to the user when the user is fishing;

a reel assembly being positioned within said interior space of said housing;

a cable member extending from said housing, said cable member being coupled to said reel assembly such that said reel assembly is for winding said cable member back into said interior space of said housing when said cable member has been extended from said housing;

a landing member being coupled to said cable member opposite said reel assembly, said reel assembly drawing said landing member back towards said housing when the user releases said landing member, said landing member being adapted for facilitating retrieval of the fish when the user has reeled in the fish;

said perimeter wall of said housing having a cap portion and a base portion, said cap portion being selectively removable from said base portion, said reel portion being adapted for being accessed by the user when said cap portion is removed from said base portion of said perimeter wall;

a loop member being coupled to an exterior surface of said cap portion of said perimeter wall, said loop portion being adapted for securing a belt of the user between said loop member and said cap portion such that said cap portion is secured to the belt of the user;

said perimeter wall having a tube portion, said tube portion extending from said base portion of said perimeter wall, said tube portion having a lumen in communication with said interior space of said housing, said cable member extending through said lumen of said tube portion of said perimeter wall such that said tube member is for guiding said cable member when said cable member is retracted by said reel assembly;

said base portion of said perimeter wall being pivotal with respect to said cap portion of said perimeter wall such that said tube portion is selectively positionable to accommodate lifting and lowering of said cable member when the user is using said landing member;

said landing member having a handle portion, said handle portion being coupled to said cable member, said handle portion of said landing member being receivable in said lumen of said tube portion of said perimeter wall when said reel assembly retracts said cable member into said interior space of said housing, said handle portion being adapted for being selectively gripped by the hand of the user when the user is landing the fish;

said handle portion of said landing member having a ridge, said ridge being positioned proximate a medial portion of said handle portion of said landing member, said ridge abutting said tube portion when said reel assembly retracts said cable member into said interior space of said housing for permitting only a portion of said handle portion of said landing member to be positioned in said lumen of said tube portion;

said landing member having a ring portion, said ring portion being coupled to said handle portion of said landing member;

said landing member having a net portion, said net portion being coupled to said ring portion, said net portion being adapted for holding the fish when the fish is passed through said ring portion and into said net portion by the user;

said housing having a spindle, said spindle extending from said cap portion through said interior space of said housing and said base portion of said perimeter wall, said reel assembly being rotatably coupled to said spindle such that said reel assembly is permitted to rotate around said spindle;

said reel assembly having a reel member., said reel member being rotatably coupled to said spindle member such that said reel member is permitted to rotate around said spindle, said reel member being coupled to said cable member opposite said landing member such that said cable member is wound onto said reel member when said reel member is rotated to retract said cable member into said interior space of said housing;

said reel assembly having a winding biasing member, said winding biasing member being coupled between said reel member and said housing, said winding biasing member being positioned into a tensed state when said reel member is rotated by said cable member being extended from said housing, said winding biasing member rotating said reel member for winding said cable member onto said reel member when said cable member is released after being extending from the housing;

said reel assembly having a positioning biasing member, said positioning biasing member being positioned around said spindle such that said positioning biasing member is positioned between said reel member and an interior surface of said perimeter wall of said housing, said positioning biasing member being for maintaining positioning of said reel member when said reel member is rotating around said spindle;

a nut member being selectively coupled to said spindle opposite said cap portion of said perimeter wall of said housing, said nut member abutting an outer surface of said base portion of said base portion of said perimeter wall such that said nut member is for inhibiting separation of said base portion from said cap portion of said perimeter wall.

\* \* \* \* \*